United States Patent
Lee et al.

(10) Patent No.: US 8,003,245 B2
(45) Date of Patent: Aug. 23, 2011

(54) BATTERY MODULE HAVING IMPROVED COOLING EFFICIENCY

(75) Inventors: Gun-Goo Lee, Yongin-si (KR);
Tae-Yong Kim, Yongin-si (KR);
Yoon-Cheol Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1406 days.

(21) Appl. No.: 11/494,807

(22) Filed: Jul. 28, 2006

(65) Prior Publication Data
US 2007/0026301 A1 Feb. 1, 2007

(30) Foreign Application Priority Data

Jul. 29, 2005 (KR) .................. 10-2005-0069491
Jul. 29, 2005 (KR) .................. 10-2005-0069493

(51) Int. Cl.
*H01M 6/42* (2006.01)
*H01M 6/46* (2006.01)
*H01M 10/50* (2006.01)

(52) U.S. Cl. ......... 429/149; 429/120; 429/153; 429/154
(58) Field of Classification Search .................. 429/120, 429/149, 153, 154
See application file for complete search history.

(56) References Cited

U.S. PATENT DOCUMENTS

| | | | |
|---|---|---|---|
| 5,589,290 A | * | 12/1996 | Klink et al. ............... 429/99 |
| 6,445,582 B1 | * | 9/2002 | Oda et al. ............... 361/695 |
| 2002/0102454 A1 | | 8/2002 | Zhou et al. |

FOREIGN PATENT DOCUMENTS

| | | |
|---|---|---|
| CN | 1638185 A | 7/2005 |
| EP | 1 174 942 A1 | 1/2002 |
| EP | 1 548 858 A2 | 6/2005 |
| EP | 1 553 655 A2 | 7/2005 |
| JP | 61-029077 | 2/1986 |
| JP | 10-255859 A | 9/1998 |
| JP | 2001-313090 | 11/2001 |
| JP | 2002-231322 | 8/2002 |
| JP | 2004-006089 | 1/2004 |
| JP | 2004-071394 | 3/2004 |
| JP | 2005-116342 | 4/2005 |
| KR | 10-2006-0101670 | 9/2006 |

OTHER PUBLICATIONS

Korean Patent Abstracts, Publication No. 10-2006-0101670, dated Sep. 26, 2006, in the name of Gun-Gu Lee et al.
European Search Report dated Nov. 23, 2007, for EP 06118129.3, which corresponds to priority application KR 10-2005-0069491, in the name of Samsung SDI Co., Ltd.
Japanese Office action dated Mar. 23, 2010, for corresponding Japanese Patent application 2006-204989, noting listed references in this IDS.

* cited by examiner

*Primary Examiner* — Helen O Conley
(74) *Attorney, Agent, or Firm* — Christie, Parker & Hale, LLP

(57) ABSTRACT

A battery module includes a battery assembly having a plurality of unit batteries. A housing receives the battery assembly and has an coolant flow passage formed around the battery assembly. A divider is installed in the coolant flow passage to divide the coolant flow passage into a plurality of sub-coolant flow passages.

24 Claims, 7 Drawing Sheets

BATTERY MODULE HAVING IMPROVED COOLING EFFICIENCY

CROSS-REFERENCES TO RELATED APPLICATION

This application claims priority to and the benefit of Korean Patent Application Nos. 10-2005-0069491 and 10-2005-0069493 filed on Jul. 29, 2005, both applications filed in the Korean Intellectual Property Office, the entire contents of which are incorporated herein by reference.

BACKGROUND OF THE INVENTION

1. Field of the Invention

The present invention relates to a battery module in which cooling efficiency of unit batteries is improved.

2. Description of the Related Art

A rechargeable battery module is typically formed by serially connecting several secondary (rechargeable) batteries (a individual secondary battery hereinafter being designated a "unit battery").

Each of the unit batteries includes an electrode assembly in which a separator is interposed between a positive electrode and a negative electrode. The electrode assembly is inserted inside a container, and a cap assembly is assembled with the container to seal the container. The cap assembly may include terminals extending from the interior to the exterior of the container and the terminals may be electrically connected to the positive electrode and the negative electrode.

If the unit batteries are prismatic type batteries, the unit batteries are arranged such that positive and negative terminals of one unit battery alternate with the positive and negative terminals of an adjacent unit battery. Electric conductor adaptors are typically mounted on the negative and positive terminals such that they are electrically connected to form the battery module.

Since the typical battery module includes several to tens of unit batteries, the heat generated from the unit batteries must be efficiently dissipated. It becomes particularly important that a temperature difference between the unit batteries of the battery module must be minimized regardless of their locations. The heat dissipation property of the battery module is a very important factor on which the performance of the battery module depends.

When the heat dissipation is not properly realized, a temperature difference between the unit batteries may be generated which deteriorates the charge/discharge efficiency. Furthermore, the temperature of the battery module may increase excessively, thereby deteriorating the performance of the battery module or, in the most severe cases, causing an explosion of the battery module.

Particularly, when the battery module is used as the high capacity secondary battery for driving motors of, for example, a vacuum cleaner, an electric scooter, or a hybrid electric vehicle, the charge and discharge is done with a large capacity of current. Thus, the internal temperature of the battery module increases excessively. This deteriorates the inherent performance of the battery module. Therefore, it becomes very important to efficiently dissipate the excessive heat out of the battery module.

SUMMARY OF THE INVENTION

The present invention provides a battery module that can uniformly cool unit batteries by improving a coolant flowing structure, thereby minimizing a temperature difference between the unit batteries.

According to an exemplary embodiment of the present invention, there is provided a battery module including: a battery assembly having a plurality of unit batteries; a housing for receiving the battery assembly and having an coolant flow passage formed for providing coolant flow through the battery assembly; and a divider installed in the coolant flow passage to divide the coolant flow passage into a plurality of sub-coolant flow passages.

The divider may include a dividing plate disposed along a length of the coolant flow passage and an extension plate extending from an end of the dividing plate distal from a coolant intake passage toward the battery assembly. The extension plate may be bent from the dividing plate at a predetermined angle, and in an exemplary embodiment, at a right angle.

The dividing plate is arranged substantially in parallel with the battery assembly or inclined toward the battery assembly.

The housing may include a coolant intake passage through which coolant is introduced into the housing and a coolant exhaust passage through which the coolant is exhausted out of the housing and the divider is installed close to the coolant intake passage. A pair of the battery assemblies may be disposed at both sides of the coolant flow passage. The coolant flow passage may include a first sub-passage formed at a longitudinal center of the coolant flow passage and second sub-passages formed at both sides of the first sub-passage. A sectional area of the first sub-passage may be substantially the same as a sum of the sectional areas of the second sub-passages. The divider may extend from an end of the battery assembly distal to the coolant intake passage to a portion of the battery assembly proximal to the coolant intake passage. The battery assembly may be divided into a pair of the battery assemblies disposed at opposing length sides of the coolant flow passage in the housing.

Barriers may be disposed between the unit batteries.

The housing may have a pair of exhaust passages, each of the pair of coolant exhaust passages being formed at respective sides of the battery assembly distal from the divider. The pair of the battery assemblies may be provided to face each other in the housing and the coolant flow passage may be formed between the pair of battery assemblies. A pair of coolant exhaust passages may be formed at respective sides of battery assembly distal from the divider. The divider may extend from ends of the pair of battery assemblies distal from the coolant intake passage to portions of the pair of battery assemblies proximal to the coolant intake passage.

The housing may include a coolant inlet through which the coolant is introduced into the housing and the divider has a wedge portion extending from an end of the battery assembly distal from the coolant inlet toward the coolant inlet.

A thickness of the divider may be within the rage of 25-35% of a width of the coolant flow passage. The divider may include a flat plate portion installed along a length of the coolant flow passage and a wedge portion extending from the flat plate portion toward the coolant inlet. The flat plate portion may extend from an end of the battery assembly distal from the coolant inlet up to a middle portion of the battery assembly. The wedge portion may extend from a middle portion of the battery assembly toward the coolant inlet.

The side surfaces of the divider may be inclined and the length of the divider may be the same as or less than that of the battery assembly.

DETAILED DESCRIPTION

In the following description, although air is used as an example of the cooling medium (coolant) of a battery module, the present invention is not limited to the use of air. For example, water or other fluids may be used as the cooling medium.

Figure 1:
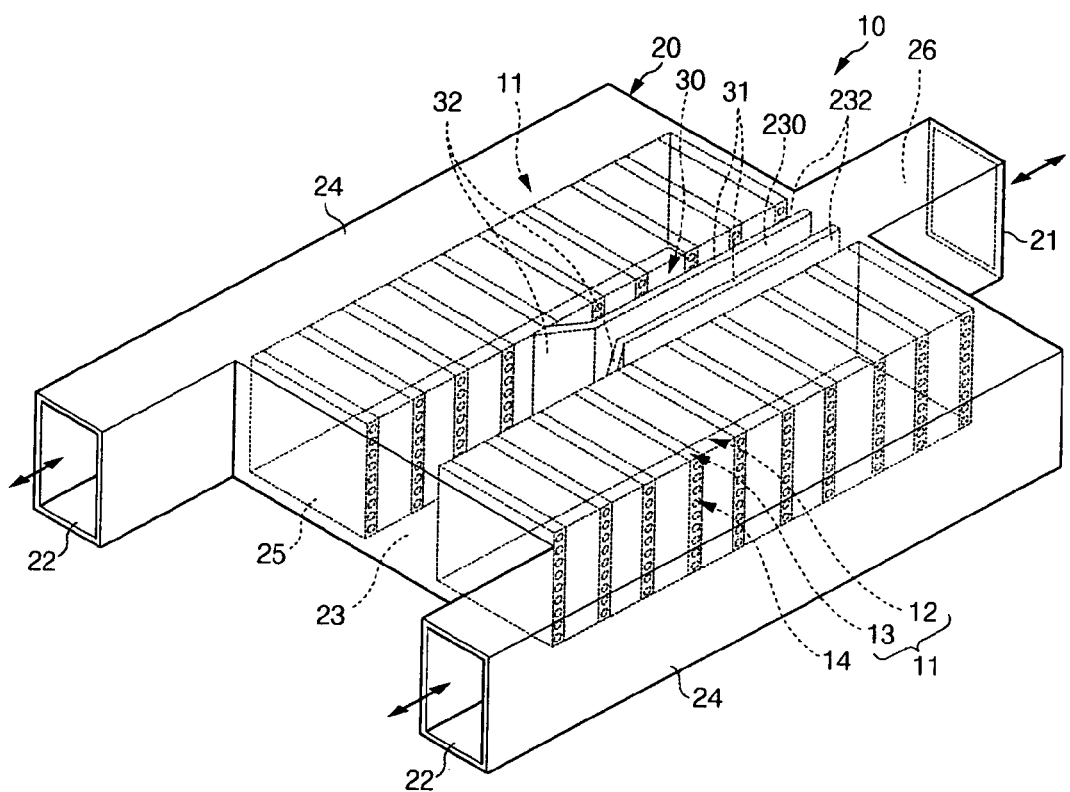
FIG. 1 is a schematic perspective view of a battery module according to an exemplary embodiment of the present invention.

With reference to FIG. 1, a battery module 10 of the present embodiment includes a battery assembly 11 having a plurality of unit batteries 12 arranged at predetermined intervals and a housing 20 receiving the battery assembly 11 and allowing cooling air to flow between the unit batteries 12.

Each of the unit batteries 12 is a conventional rechargeable battery for charging and discharging predetermined electric power. That is, the unit battery 12 includes an electrode assembly having positive and negative electrodes between which a separator is interposed.

The battery assembly 11 is a structure formed by the plurality of unit batteries 12 spaced apart from each other in a line.

In an exemplary embodiment, the battery assembly 11 is formed by stacking a plurality of prismatic unit batteries 12.

In addition, a pair of similar battery assemblies 11 may be provided in the housing 20. In this case, the battery assemblies 11 correspond to and are spaced apart from each other. By so locating the pair of corresponding battery assemblies 11, the overall height of the battery module 10 can be minimized.

In each of the battery assemblies 11, a plurality of barriers 13 are disposed between the unit batteries 12 and on outer sides of outermost unit batteries 12 in the stack. The barriers 13 function to maintain gaps between the unit batteries 12 which allow temperature control air to flow between the unit batteries 12, and to support side surfaces of the unit batteries 12.

To allow the temperature control air to flow, each of the barriers 13 is provided with channels 14 through which cooling air flows to control the temperature of the unit batteries 12.

In the present embodiment, the channels 14 of FIG. 1 are formed as a series of holes penetrating through the barriers 13. However, the present invention is not limited to such a channel structure. As long as the air can flow, any structure which accomplishes the air flow may be used.

In the above-described battery module 10, the housing 20 functions to fix the battery assemblies 11 and to dissipate the heat generated from the unit batteries 12 by allowing temperature control air to pass through the channels 14 between the unit batteries 12 of the battery assemblies 11.

To achieve the air passage, the housing 20 includes a fixing portion 25 for fixing the battery assemblies 11 and air passages 26, 23, formed at a center of the housing 20 between the pair of the battery assemblies 11 and air passages 24 formed at both sides of the housing 20.

The air intake passage 26 and the air exhaust passage 24 are connected respectively to an air inlet 21 and to an air outlet 22.

In the present embodiment, the air passage 23 extends from the air passage 26. In addition, the passages 26, 24 may be passages which either introduce or exhaust air according to a coolant flow type (i.e., a blower type or a suction type) of the battery module 10.

In the following description, the blower type will be used as a representative example, where the air passages 26, 23 formed at the center of the housing 20 function as air intake passages and the air passages 24 formed at both sides of the housing 20 function as air exhaust passages.

The fixing portion 25 defines receiving spaces for receiving and fixing the battery assemblies 11. The receiving spaces are formed at both sides of the airflow passage 23 formed at the center of the housing. The pair of the battery assemblies 11 are received and fixed in the receiving spaces of the fixing portion 25.

That is, the airflow passage 23 is formed at the center of the housing 20 and the pair of the battery assemblies 11 are disposed at both sides of the airflow passage 23. In addition, the air exhaust passages 24 are formed at the outer facing sides of the battery assemblies 11. The air exhaust passages 24 communicate with the air outlets 22 formed in the direction where the temperature control air flows.

Accordingly, the temperature control air is introduced into the air intake passage 26 through the air inlet 21, directed to the exhaust passages 24 through the barriers 13 disposed between the unit batteries 12 arranged along the airflow passage 23, and exhausted through the air outlets 22.

A divider 30 is installed in the airflow passage 23 to divide the airflow passage 23. The divider 30 is provided to allow the air introduced into the airflow passage 23 through the air intake passage 26 to be selectively supplied to a specific portion of the battery assemblies 11.

The divider 30 includes a pair of dividing plates 31 disposed in the airflow passage 23 and spaced apart from each other at predetermined intervals. The dividing plates 31 are arranged in parallel with inner facing sides of the battery assemblies 11. That is, the dividing plates 31 extend in a longitudinal direction of the airflow passage 23. The divider 30 further includes extension plates 32 extending from the respective dividing plates 31 toward the battery assemblies 11.

Figure 2:
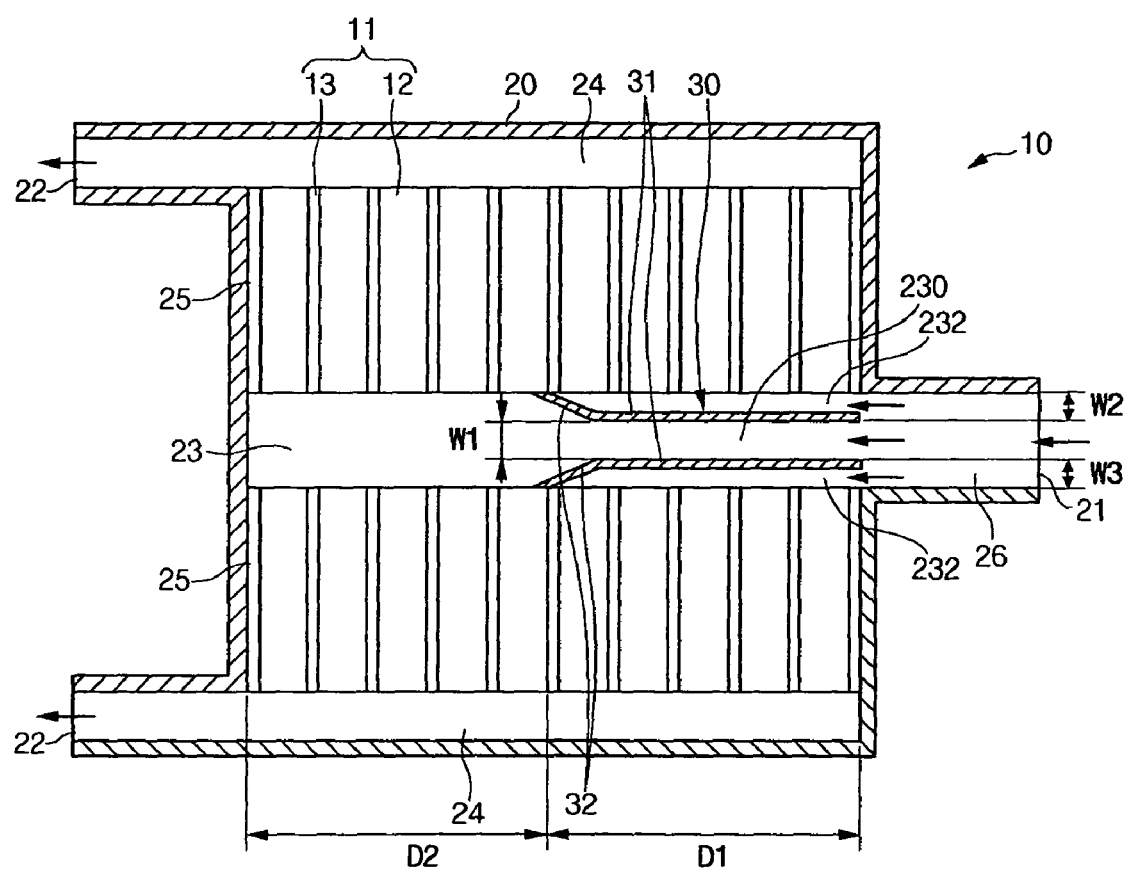
FIG. 2 is a sectional top view of the battery module of FIG. 1.
Figure 3:
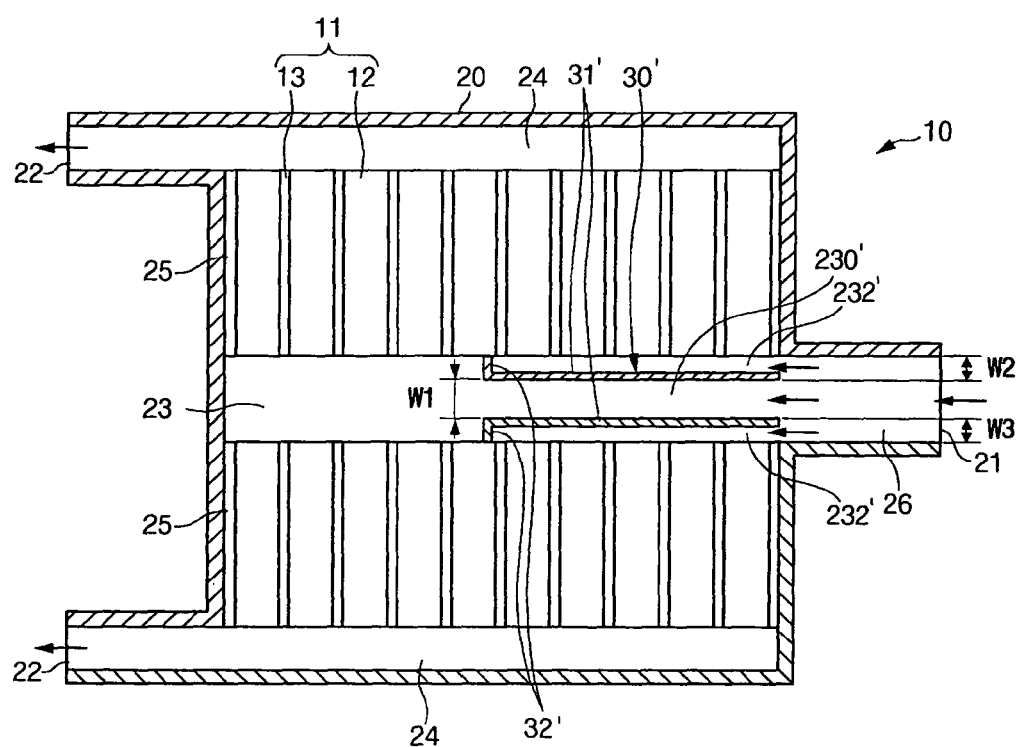
FIG. 3 is a view of a modified example of a divider of the battery module of FIG. 1.

As shown in FIG. 2, the extension plates 32 may be bent from the dividing plates 31 toward the battery assemblies 11 at an obtuse angle. Alternatively, as shown in FIG. 3, extension plates 32' may be bent from the dividing plate 31' at right angles.

Upper and lower surfaces of the dividers 30, 30' may contact inner walls of the housing 20. As the housing 20 is separated to receive the pair of the battery assemblies 11, the dividers 30, 30' may be properly separated in response to the separation of the housing 20.

The dividing plates 31, 31' may extend toward the air inlet 21 up to at least a starting portion of the airflow passage 23, and in an exemplary embodiment, up to the air inlet 21.

In addition, in an exemplary embodiment the extreme ends of the extension plates 32 may be disposed proximal to the battery assemblies 11.

As described above, the battery assemblies 11 are disposed at both sides of the airflow passage 23 formed at the center of the housing 10. Therefore, when two of the dividing plates 31, 31' are disposed in the airflow passage 23, first sub-airflow passage 230, 230' is formed between the dividing plates 31, 31' and second sub-airflow passages are formed between one of the dividing plate 31, 31' and one of the battery assembles 11 and between the other of the dividing plate 31, 31' and the other of the battery assemblies 11.

Therefore, the temperature control air introduced through the air inlet 21 is divided by the dividing plates 31, 31' to flow along the first sub-airflow passage 230, 230' and the second sub-airflow passages 232, 232'.

Here, a section where the divider 30, 30' is disposed in the airflow passage 23 is about 50% of the overall length of the battery assembly 11. That is, the divider 30, 30' extends from a downstream end of the air inlet 21 to a mid-point of the battery assemblies 11.

The unit batteries 12 disposed corresponding to the section D1 receive the air temperature air introduced through the second sub-airflow passages 232.

The remaining section D2 of the airflow passage 23 is about 50% of the overall length of the battery assembly 11. The unit batteries 12 disposed corresponding to the section D2 receive the temperature control air introduced through the first sub-airflow passage 230.

The length of the section D1 where the divider 30 is positioned is not limited to the above case. The length of the section D1 may be properly adjusted according to sectional areas of the sub-airflow passages divided by the divider 30 or widths of the sub-airflow passages.

In the present embodiments shown in FIGS. 2 and 3, a width W1 of the first sub-airflow passage 230, 230' is identical to a sum of widths W2 and W3 of the second sub-airflow passages 232, 232'. That is, a sectional area of the first sub-airflow passage 230, 230' is identical to a sum of sectional areas of the second sub-airflow passages 232, 232'.

By the above-described structure of the first sub-airflow passages 230, 230' and the second sub-airflow passages 232, 232', 50% of the temperature control air introduced from the air intake passage 26 to the airflow passage 23 flows along the first sub-airflow passage 230, 230' and the rest flows along the second sub-airflow passages 232, 232'.

Figure 4:
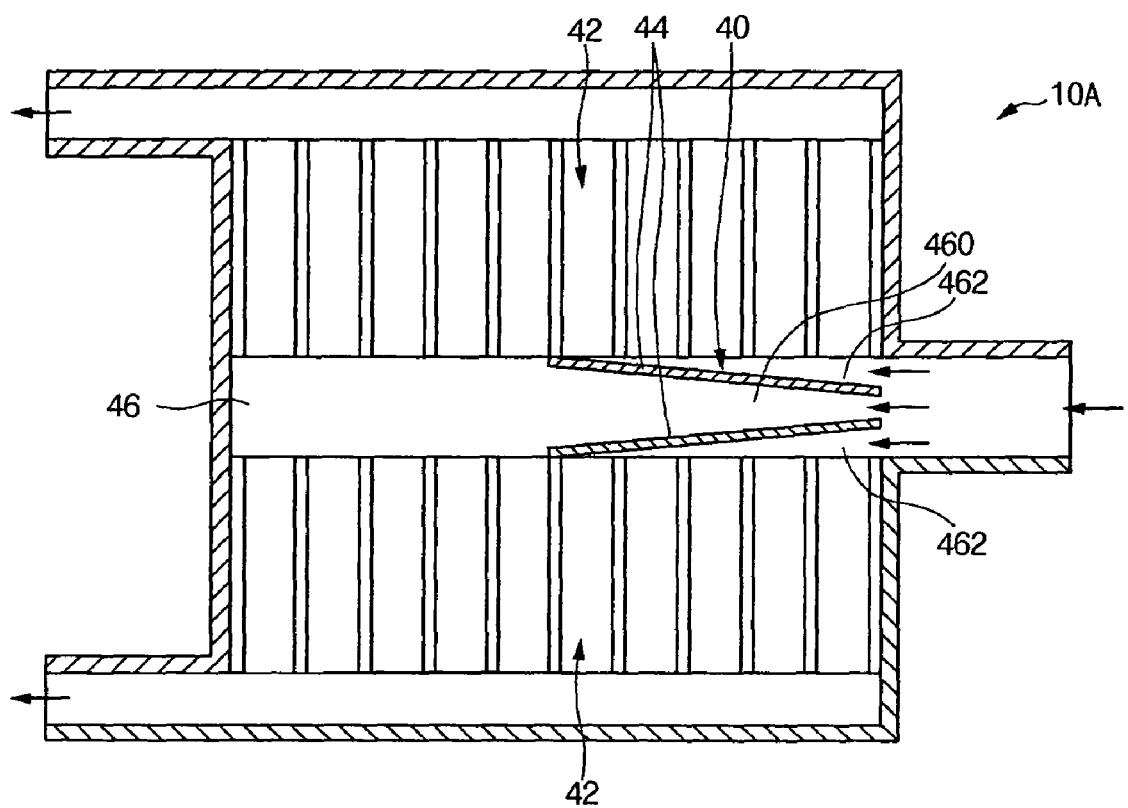
FIG. 4 is a sectional top view of a battery module according to another embodiment of the present invention.

FIG. 4 shows a battery module according to another embodiment of the present invention. The battery module of this embodiment is identical to that of FIG. 1 except for the structure of the divider. Therefore, only the divider will be described in this embodiment.

Referring to FIG. 4, a divider 40 of a battery module 10A according to the present embodiment includes a pair of dividing plates 44 inclined toward battery assemblies 42. That is, the dividing plates 44 are disposed in an airflow passage 46 and spaced apart from each other at a predetermined interval. First ends of the dividing plates 44, which are proximal to the air inlet, are spaced apart from the battery assemblies 42 and second ends of the dividing plates 44, which are distal from the air inlet, closely contact the battery assemblies 42.

The above-described divider 40 divides the airflow passage 46 into first and second sub-airflow passages 460 and 462. Here, the inclined angles of the dividing plates 44 are not limited to any specific value.

The representative operation of the embodiments of battery module in accordance with the present invention will now be described in more detail with reference to of FIGS. 1 and 2.

The temperature control air introduced into the housing 20 through the air inlet 21 is separated by the divider 30 and is directed into the first sub-airflow passage 230 and second sub-airflow passages 232. The temperature control air directed to the first sub-airflow passage 230 and second sub-airflow passage 232 passes through the battery assemblies 11 and is then exhausted out of the housing 20 through the air outlets 22 via the exhaust passages 24.

The air directed into the second sub-airflow passage 232 is used as coolant for the unit batteries 12 corresponding to the section where the divider 30 is disposed in the airflow passage 23.

That is, the temperature control air introduced into the second sub-airflow passages 232 is directed toward the unit batteries 12 that are relatively closer to the air inlet 26 to cool these unit batteries 12.

Namely, a part of the coolant introduced into the housing is forcedly directed to specific unit batteries 12 according to the position of the battery assemblies 11 to cool the specific unit batteries 12.

Therefore, a sufficient amount of temperature control air can be supplied to even the unit batteries 12 that are disposed close to the air inlet 21 of the housing 20, thereby all of the unit batteries 12 of the battery assemblies 11 can be uniformly cooled.

Amounts of the temperature control air provided to the sections of the battery assemblies 11 may be identical according to the structure of the divider 20. Therefore, the unit batteries 12 of the battery assemblies 11 can be more uniformly cooled.

Figure 5:
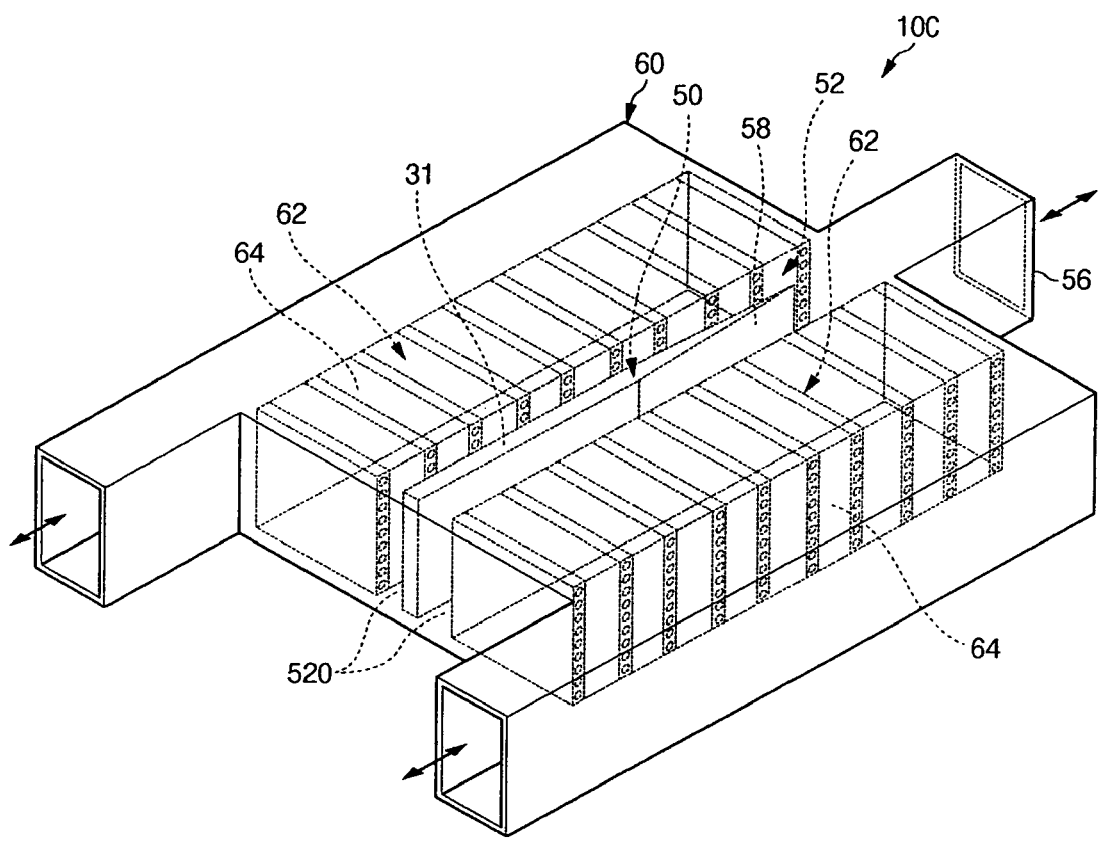
FIG. 5 is a perspective view of a battery module according to another embodiment of the present invention.
Figure 6:
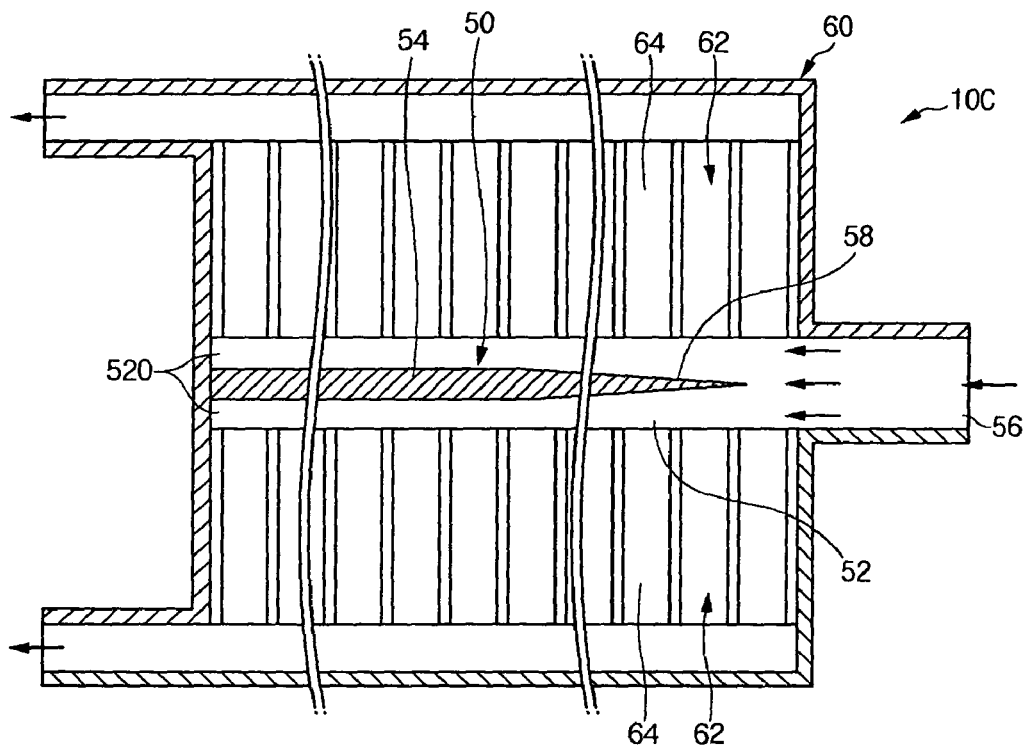
FIG. 6 is a sectional top view of the battery module of FIG. 5.

FIGS. 5 and 6 show a battery module according to another embodiment of the present invention. The battery module of this embodiment is similar to that of FIG. 1 except for the structure of the divider. Therefore, only the divider will be described in this embodiment.

A divider 50 of a battery module 52 is formed of a plate-structure disposed along a longitudinal centerline of an airflow passage 52. The divider 50 includes a flat plate portion 54 and a wedge portion 58 extending from the flat plate portion 54. That is, a thickness of the wedge portion 58 is gradually reduced as it proceeds toward the air inlet 56.

The flat plate portion 54 contacts closely an inner surface of the housing 60, which correspond to an inner end of the airflow passage 52 and the wedge portion 58 extends toward the air inlet 56.

Accordingly, the airflow passage 52 is divided into a pair of sub-airflow passages 520. As a result of the wedge portion 58, the sectional areas (in a direction perpendicular to the longitudinal direction of the airflow passage) of the sub-airflow passages 520 at a section where the wedge portion 58 is formed are gradually reduced as they become distal from the air inlet 56.

Accordingly, the temperature control air introduced into the housing 60 through the air inlet 56 is separated while passing by the wedge portion 58 and supplied to the unit batteries 64 disposed at both sides of the airflow passage 52. The unit batteries of the battery assemblies 62 that are disposed proximal to the air inlet 56 are supplied with a sufficient amount of the temperature control air by the structure of the divider 50 to be cooled. As a result, it can be expected that the unit batteries 64 can be uniformly cooled.

In this embodiment, a thickness of the flat plate portion 54 may be within the range of about 25-35% of a width of the airflow passage 52.

That is, when the thickness of the flat plate portion 54 is less than 25% of the width of the airflow passage 52, it is difficult to direct the temperature control air up to the unit batteries of the battery assemblies 62 disposed proximal to the air inlet 56. When the thickness of the flat plate portion 54 is greater than 35% of the width of the airflow passage 52, it is difficult to direct the temperature control air up to the unit batteries 64 disposed distal from the air inlet 56.

A thickness of the boundary between the flat plate portion 54 and the wedge portion 58 are comparable so that the flat plate portion 54 can be gently blend with the wedge portion 58.

In the present embodiment, the section where the flat plate portion 54 is placed extends from the inner end of the airflow passage 52 up to a middle portion of the battery assemblies 62.

For example, when the number of the unit batteries 64 of the battery assembly 62 is 20, the section where the flat plate portion 54 is placed extends from the inner end of the airflow passage 52 to a tenth unit battery 64.

As a result, a section where the wedge portion 58 is placed in the airflow passage 52 may extend from the middle portion of the battery assembly 62 toward the air inlet 56.

An extreme end of the wedge portion 58 may be aligned with an extreme end of the battery assembly 62 or may not reach the extreme end of the battery assembly 62.

Figure 7:
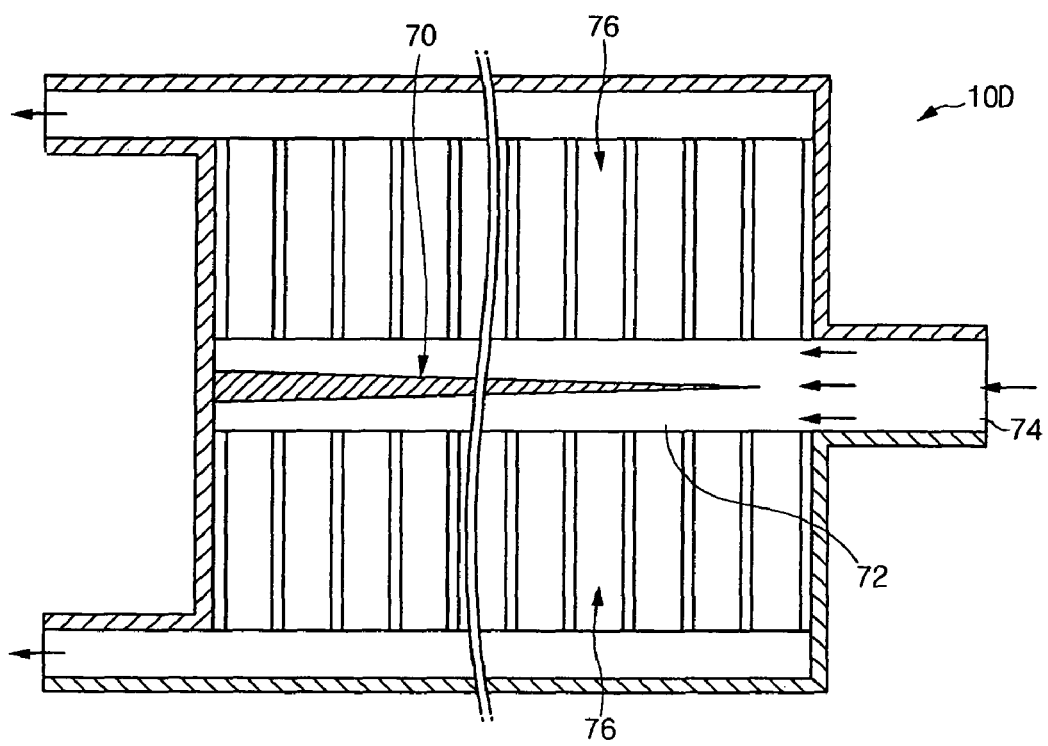
FIG. 7 is a sectional top view of a battery module according to another embodiment of the present invention.

FIG. 7 shows a battery module according to another embodiment of the present invention. The battery module of this embodiment is identical to that of FIG. 1 except for the structure of the divider. Therefore, only the divider will be described in this embodiment.

Referring to FIG. 7, a divider 70 of a battery module 10D is wedge-shaped. That is, a thickness of the divider 70 is reduced as it goes from an inner end of an airflow passage 72 toward an air inlet 74.

In this embodiment, both side surfaces of the divider 70, which face the respective battery assemblies 76, are inclined at identical angles.

The divider 70 is disposed along a central length of the airflow passage 72. An extreme end of the divider 70 may be aligned with an extreme end of the battery assembly 76 or may not reach the extreme end of the battery assembly 76.

According to the present invention, by improving a structure of the airflow passage for the temperature control air flowing in the housing all of the unit batteries of the battery module can be uniformly cooled, thereby improving the performance of the battery module.

Although exemplary embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A battery module comprising:
a battery assembly having a plurality of unit batteries;
a housing for receiving the battery assembly and having a coolant flow passage formed for providing coolant flow through the battery assembly; and
a divider installed in the coolant flow passage, the divider divides the coolant flow passage into a first sub-passage formed at a longitudinal center of the coolant flow passage and second sub-passages formed at both sides of the first sub-passage and isolated from the first sub-passage by, the divider divides.

2. The battery module of claim 1, wherein the divider includes a dividing plate disposed along a length of the coolant flow passage.

3. The battery module of claim 2, wherein:
the housing includes a coolant intake passage through which coolant is introduced into the housing and a coolant exhaust passage through which the coolant is exhausted out of the housing, and
the divider further includes an extension plate extending from an end of the dividing plate distal from the coolant intake passage toward the battery assembly.

4. The battery module of claim 3, wherein the extension plate extends from the dividing plate at a predetermined angle.

5. The battery module of claim 3, wherein the extension plate extends from the dividing plate at a right angle.

6. The battery module of claim 2, wherein:
the plurality of unit batteries are stacked, and
the dividing plate is arranged substantially in parallel with a direction of stacking of the battery assembly.

7. The battery module of claim 2, wherein the dividing plate is inclined from the coolant intake passage toward the battery assembly.

8. The battery module of claim 1, wherein the divider is installed proximal to the coolant intake passage.

9. The battery module of claim 1, wherein:
the housing includes:
a coolant intake passage through which coolant is introduced into the housing, and
a coolant exhaust passage through which the coolant is exhausted out of the housing.

10. The battery module of claim 1, wherein a sectional area of the first sub-passage is substantially the same as a sum of sectional areas of the second sub-passages.

11. The battery module of claim 1, wherein the battery assembly is divided into a pair of battery assemblies disposed at opposing length sides of the coolant flow passage.

12. The battery module of claim 1, wherein the battery assembly includes barriers disposed between the unit batteries, the barriers having coolant flow channels.

13. The battery module of claim 1, wherein the coolant flow passage has a pair of coolant exhaust passages, each of the pair of coolant exhaust passages being formed at respective sides of the battery assembly distal from the divider.

14. The battery module of claim 13, wherein:
the battery assembly includes a pair of battery assemblies facing each other in the housing, and
the coolant flow passage is formed between the pair of battery assemblies.

15. The battery module of claim 14, wherein
the housing includes a coolant intake passage through which coolant is introduced into the housing and a coolant exhaust passage through which the coolant is exhausted out of the housing, and
the divider extends from ends of the pair of battery assemblies distal from the coolant intake passage to portions of the pair of battery assemblies proximal to the coolant intake passage.

16. A battery module comprising:
a battery assembly having a first plurality of unit batteries and a second plurality of unit batteries;
a housing for receiving the battery assembly and having a coolant flow passage between the first plurality of unit batteries and the second pluralities of unit batteries, the coolant flow passage being configured to provide coolant flow through the battery assembly to the first and second pluralities of unit batteries; and
a divider installed in the coolant flow passage, the divider divides the coolant flow passage into a first sub-passage formed at a longitudinal center of the coolant flow passage and second sub-passages formed at both sides of the first sub-passage and isolated from the first sub-passage by the divider.

17. The battery module of claim 16, wherein:
the housing includes a coolant intake passage through which coolant is introduced into the housing and a coolant exhaust passage through which the coolant is exhausted out of the housing, and
the divider extends from an end of the battery assembly distal from the coolant intake passage to a portion of the battery assembly proximal to the coolant intake passage.

18. The battery module of claim 16, wherein:
the housing includes a coolant inlet through which the coolant is introduced into the housing, and
the divider has a wedge portion narrowingly extending from an end of the battery assembly distal from the coolant inlet toward the coolant inlet.

19. The battery module of claim 16, wherein a thickness of the divider is within the range of 25-35% of a width of the coolant flow passage.

20. The battery module of claim 16, wherein:
the housing includes a coolant inlet through which coolant is introduced into the housing, and
the divider includes a flat plate portion installed along a length of the coolant flow passage and a wedge portion narrowingly extending from the flat plate portion toward the coolant inlet.

21. The battery module of claim 20, wherein the flat plate portion extends from an end of the battery assembly distal from the coolant inlet to a middle portion of the battery assembly.

22. The battery module of claim 20, wherein the wedge portion extends from a middle portion of the battery assembly toward the coolant inlet.

23. The battery module of claim 18, wherein side surfaces of the divider are inclined.

24. The battery module of claim 23, wherein a length of the divider is the same as or is less than a length of the battery assembly.

* * * * *

UNITED STATES PATENT AND TRADEMARK OFFICE
CERTIFICATE OF CORRECTION

| | |
|---|---|
| PATENT NO. | : 8,003,245 B2 |
| APPLICATION NO. | : 11/494807 |
| DATED | : August 23, 2011 |
| INVENTOR(S) | : Gun-Goo Lee et al. |

Page 1 of 1

It is certified that error appears in the above-identified patent and that said Letters Patent is hereby corrected as shown below:

In the Claims

Column 7, Claim 1, line 55     Delete "divides"
Insert -- dividing --

Column 7, Claim 1, line 59     Delete "by, the divider divides."
Insert -- by the divider. --

Column 8, Claim 7, line 14     Delete "the coolant"
Insert -- a coolant --

Column 8, Claim 7, line 14     After "passage"
Insert -- of the housing --

Column 8, Claim 8, line 17     Delete "the"
Insert -- a --

Column 8, Claim 8, line 17     After "passage"
Insert -- of the housing --

Column 8, Claim 16, line 61     Delete "divides"
Insert -- dividing --

Signed and Sealed this
Twenty-fifth Day of September, 2012

David J. Kappos
*Director of the United States Patent and Trademark Office*